(12) United States Patent
Chandra et al.

(10) Patent No.: US 8,407,367 B2
(45) Date of Patent: Mar. 26, 2013

(54) UNIFIED CONNECTOR ARCHITECTURE

(75) Inventors: Prashant R. Chandra, Santa Clara, CA (US); Ajay V. Bhatt, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 11/964,666

(22) Filed: Dec. 26, 2007

(65) Prior Publication Data

US 2009/0172185 A1  Jul. 2, 2009

(51) Int. Cl.
*G06F 15/16* (2006.01)
*G06F 13/38* (2006.01)

(52) U.S. Cl. ........ 709/246; 709/230; 709/236; 709/238; 710/62; 710/63

(58) Field of Classification Search .................. 709/230, 709/236, 238; 710/62–63
See application file for complete search history.

(56) References Cited

U.S. PATENT DOCUMENTS

| | | | |
|---|---|---|---|
| 4,767,168 A | 8/1988 | Grandy | |
| 5,242,315 A | 9/1993 | O'Dea | |
| 5,267,337 A | 11/1993 | Kirma | |
| 5,419,717 A | 5/1995 | Abendschein et al. | |
| 5,535,036 A | 7/1996 | Grant | |
| 6,108,782 A | 8/2000 | Fletcher et al. | |
| 6,272,551 B1 | 8/2001 | Martin et al. | |
| 6,478,625 B2 | 11/2002 | Tolmie et al. | |
| 6,536,670 B1 | 3/2003 | Postman et al. | |
| 6,549,966 B1 | 4/2003 | Dickens et al. | |
| 6,588,938 B1 | 7/2003 | Lampert et al. | |
| 6,839,771 B1 | 1/2005 | Bouchier et al. | |
| 7,081,023 B2 | 7/2006 | Zhang et al. | |
| 7,095,927 B2 | 8/2006 | Yamada et al. | |
| 7,330,468 B1 | 2/2008 | Tse-Au | |

(Continued)

FOREIGN PATENT DOCUMENTS

| | | |
|---|---|---|
| JP | 10-233820 | 9/1998 |
| JP | 2001-358733 | 12/2001 |

(Continued)

OTHER PUBLICATIONS

International Search Report and Written Opinion received for PCT Patent Application No. PCT/US2008/084621, mailed on May 18, 2009, 13 pages.

(Continued)

*Primary Examiner* — David Lazaro
*Assistant Examiner* — Farzana Huq
(74) *Attorney, Agent, or Firm* — Schwabe, Williamson & Wyatt, P.C.

(57) ABSTRACT

A system, device, and method are disclosed. In one embodiment the system includes a first host controller that utilizes a first protocol. The system also includes a second host controller that utilizes a second protocol. The system also includes a unified connector port. Finally, the system includes a router that is coupled to the first host controller, the second host controller, and the unified connector port. The router is functionally capable of encapsulating a physical layer packet from the first host controller into a first unified connector protocol frame and then transmits the new first frame to the unified connector port. The router is also capable of encapsulating a physical layer packet that it receives from the second host controller into a second unified connector protocol frame and then transmits the second frame to the unified connector port. The first and second protocols are not the same protocol.

47 Claims, 5 Drawing Sheets

U.S. PATENT DOCUMENTS

| | | |
|---|---|---|
| 7,412,544 B2 | 8/2008 | Gibson et al. |
| 7,646,981 B2 | 1/2010 | Coffey |
| 8,051,217 B2 | 11/2011 | Goodart et al. |
| 2002/0049862 A1 | 4/2002 | Gladney et al. |
| 2002/0160656 A1 | 10/2002 | Nishita |
| 2003/0179711 A1 | 9/2003 | Huff |
| 2003/0208652 A1* | 11/2003 | Kuhlmann et al. ........... 710/305 |
| 2005/0102682 A1 | 5/2005 | Shah et al. |
| 2005/0283549 A1 | 12/2005 | Gibson et al. |
| 2007/0005867 A1 | 1/2007 | Diamant |
| 2007/0249193 A1 | 10/2007 | Penumatcha et al. |
| 2007/0297799 A1 | 12/2007 | Tse-Au |
| 2008/0028120 A1 | 1/2008 | McLeod |
| 2008/0062980 A1 | 3/2008 | Sunaga et al. |
| 2009/0028495 A1 | 1/2009 | Anrig et al. |
| 2010/0049885 A1 | 2/2010 | Chandra et al. |

FOREIGN PATENT DOCUMENTS

| | | |
|---|---|---|
| KR | 10-2001-0076079 A | 8/2001 |
| WO | 2009/085494 A1 | 7/2009 |
| WO | 2010021844 | 2/2010 |

OTHER PUBLICATIONS

International Preliminary Report on Patentability for PCT Patent Application No. PCT/US2008/084621, mailed on Jul. 8, 2010, 8 pages.

European Search Report received for European Patent Application No. 08868735.5-2212/2241068 , Mailed on Sep. 2, 2011, 3 pages.

Office action for Taiwan Application No. 97147418, mailed Jun. 14, 2012.

Office action for Korean Application No. 10-2010-7016587, mailed Jul. 11, 2011.

Office action for Korean Application No. 10-2010-7016587, mailed Apr. 26, 2012.

Office action for Japanese Application No. 2010-540703, mailed Nov. 22, 2011.

Office action for European Application No. 08868735.5, mailed Sep. 29, 2011.

Office action for Chinese Application No. 200880122959.5, mailed Mar. 19, 2012.

International Search Report & Written Opinion for PCT/US2009/052831, mailed Mar. 15, 2010.

International Preliminary Report on Patentability for PCT/US2009/052831, mailed Mar. 03, 2011.

Search Report for European Application No. 09808593.9, mailed Aug. 19, 2011.

Office action for European Application No. 09808593.9, mailed Sep. 13, 2011.

* cited by examiner

UNIFIED CONNECTOR ARCHITECTURE

FIELD OF THE INVENTION

The invention relates to the implementation of a unified connector architecture across a computer system.

BACKGROUND OF THE INVENTION

Current computer platform architecture has a variety of host controllers to implement a number of different types of I/O between computer platforms and peripherals that are connected to the platforms. For example, a graphics host controller potentially has analog and digital ports with corresponding connection interfaces (i.e. the plugs at the ends of the cables connecting a display device to a computer platform. Local area network controllers within the platform commonly have one or more Ethernet jacks. The Universal Serial Bus (USB) subsystem has a number of associated USB plug interfaces. IEEE 1394 Firewire also may have one or more plug interfaces. The list of separate and distinct ports and the associated hardware interfaces to plug peripherals into a computer platform go on and on. Computer platforms with all of these interfaces and corresponding hardware jacks/plugs have a significant requirement for large amount of motherboard and case real estate to get all of this hardware in one spot. This has limited the ability for mobile computers to have a full complement of these interfaces and the rear peripheral interface panel on many desktop systems has unfortunately grown in size as well.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a system, device, and method to implement a unified connector architecture on a computer platform are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
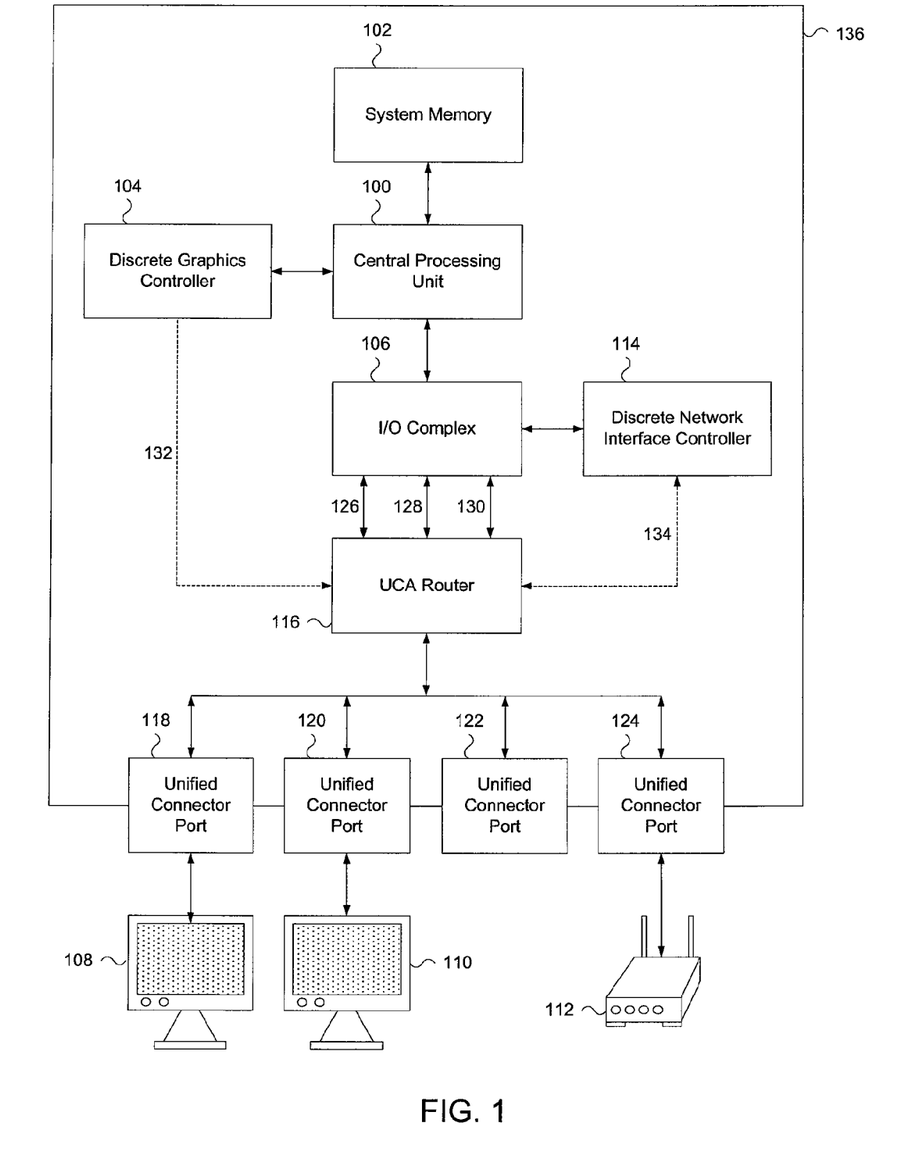
FIG. 1 describes one embodiment of a system-level implementation of a unified connector architecture.

FIG. 1 describes one embodiment of a system-level implementation of a unified connector architecture. In many embodiments, the system includes one or more processors, such as central processing unit (CPU) 100. In different embodiments, CPU 100 may include one core or multiple cores. In some embodiments, the system is a multiprocessor system (not shown) where each of the processors has one core or multiple cores.

CPU 100 is coupled to system memory 102 through one or more high speed links (i.e. interconnects, buses, etc). System memory 102 is capable of storing information that CPU 100 utilizes to operate and execute programs and operating systems. In different embodiments, system memory 102 may be any usable type of readable and writeable memory such as a form of dynamic random access memory (DRAM).

In some embodiments, CPU 100 is also coupled to a discrete graphics controller 104 through an additional high speed link. The discrete graphics controller 104 may be physically coupled to a motherboard or other such printed circuit board through a slot connector. In many embodiments, the discrete graphics controller may be a PCI Express® graphics controller/card that is plugged into a PCI Express® graphics slot connector. In this case, the PCI Express® graphics controller/card may be compliant with a revision of the specification such as PCI Express® Base Specification, Rev. 2.0, published on Dec. 20, 2006. In other embodiments, the discrete graphics controller utilizes a protocol other than PCI Express®. In some embodiments, CPU 100 is coupled to multiple discrete graphics controllers (embodiments with multiple discrete graphics controllers are not shown).

CPU 100 is also coupled to I/O complex 106, in many embodiments. I/O complex 106 may house one or more I/O host controllers, each of which control one or more I/O links that allow CPU 100 to communicate with I/O peripherals attached to the computer system. I/O peripherals such as display 108, display 110, and wireless router 112 are examples of I/O peripherals that may be attached to the computer system.

I/O complex 106 is coupled to a discrete network interface controller (NIC) 114, in many embodiments. Discrete NIC 114 is capable of providing an interface between the computer system and one or more networks external to the computer system. These networks may include networks such as wireless and wired intranet networks within a domain that the computer is located within or they may also include the Internet itself.

In many embodiments, the system in FIG. 1 includes a unified connector architecture (UCA) router 116, which is coupled to one or more unified connector ports by way of one or more high-speed links. Here, four unified connector ports are shown: port 118, port 120, port 122, and port 124. The UCA router 116 is also coupled to I/O complex 106 through one or more I/O links, as mentioned above. These include I/O links such as the Universal Serial Bus (USB) and/or any other potential I/O links. FIG. 1 shows three such links: I/O link 126, I/O link 128, and I/O link 130.

UCA router 116, in many embodiments, is a discrete component on the motherboard 136 in the computer system. In other embodiments, the UCA router may be integrated into I/O complex 106 (these embodiments are not shown).

In previously implemented computer systems, an end point of an I/O link, opposite the I/O complex 106, would be a protocol-specific port that would allow a compatible peripheral to be attached to the port (i.e. a USB keyboard device would be plugged into a USB port, a wireless router device would be plugged into a LAN/Ethernet port, etc.). Any single port would be limited to devices with a compatible plug and compatible protocol. Once a compatible device is plugged into the port, a communication link would be established between the I/O complex and the peripheral.

In the computer system as described in the embodiment shown in FIG. 1, the I/O links (126-130) couple the I/O complex 106 with the UCA router 116, the router then encapsulates data packets, originally sent in the specific host controller data packet format, to a unified connector protocol data packet format. The UCA router 116 then routes the unified connector protocol data packet to the unified connector port that has the target peripheral attached (i.e. coupled, plugged into). Thus, in these embodiments, I/O peripherals such as display 108, display 110, and wireless router 112 all are compatible with the unified connector protocol and have unified connector form factor plugs to plug into any one of the unified connector ports (118-124).

Additionally, the UCA router 116 translates unified connector protocol data packets coming from any of the connected peripherals to the protocol that is native to the targeted I/O host controller within the I/O complex.

Thus, I/O data (e.g. display, networking, USB, etc), both sent from the computer system to a peripheral and sent from a peripheral to the computer system, are packetized and encapsulated at the physical layer inside each unified connector protocol data packet. In regard to the discrete graphics and discrete NIC controllers, these controllers generate and receive I/O data that is formatted according to the physical layers defined by their respective protocol stacks. When this data is carried over a unified connector port, it is further encapsulated within a packet format (i.e. frame format) defined by the unified connector data protocol. The specific implementation of how the UCA router 116 accomplishes the encapsulation and packetization is described in detail below in reference to FIG. 2.

Returning to FIG. 1, in many embodiments, additional dedicated links are shown directly coupling the discrete graphics controller 104, as well as the discrete NIC 114, to the UCA router 116. These links are shown as dotted-line links 132 and 134 respectively. The display and network dotted-line links allow a display device and/or a network device to be plugged into the computer system through a unified connector port (e.g. one of unified connector ports 118-124). Links 132 and 134 remove the previously necessary display and network coupling locations from ports attached directly to the discrete cards. For example, previously a display peripheral was plugged directly into the display port on the graphics card. With the unified connector architecture implementation, the display and network device(s) are attached to a unified connector port, which is located on the system motherboard 136 instead of on the discrete graphics controller 104 card.

Figure 2:
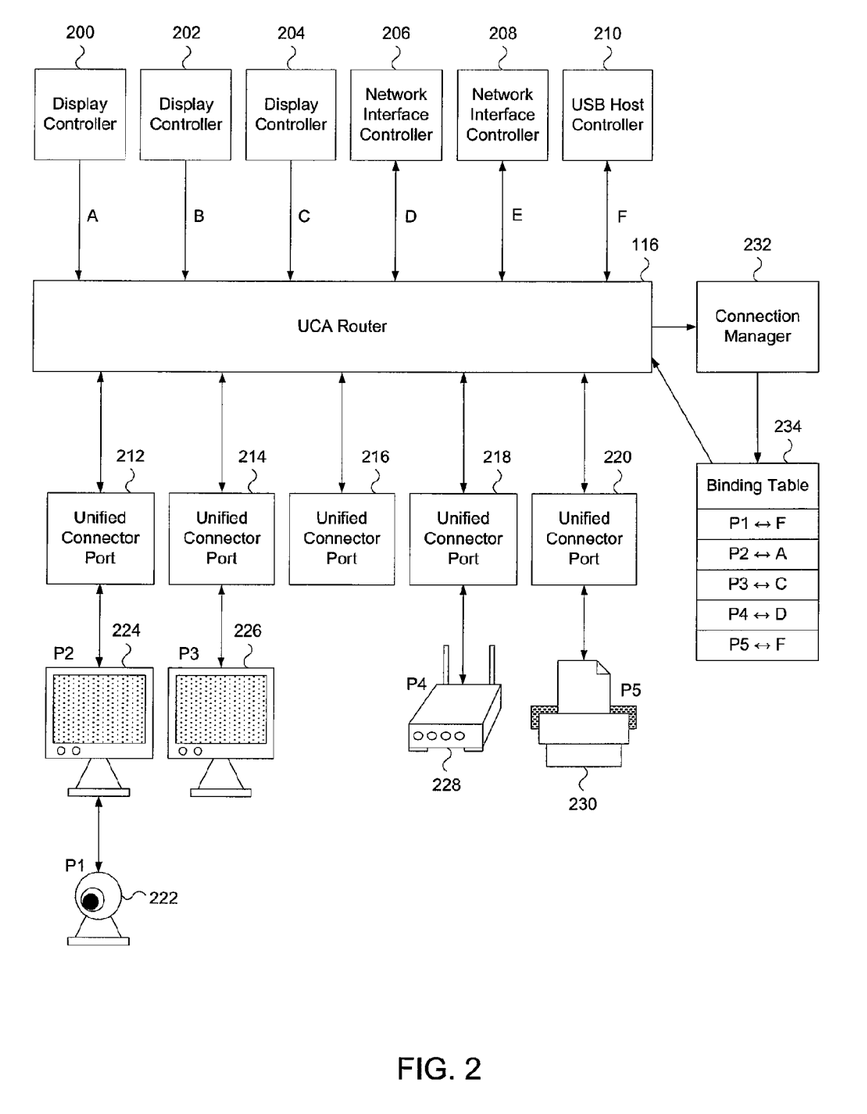
FIG. 2 describes one embodiment of a unified connector architecture (UCA) router and accompanying unified connector architecture logic.

FIG. 2 describes one embodiment of a unified connector architecture (UCA) router and accompanying unified connector architecture logic. The UCA router 116 is shown, as in FIG. 1, coupled to several host controllers (display controllers 200, 202, and 204, NICs 206 and 208, and USB host controller 210). Additionally, UCA router 116 is also coupled to several unified connector ports (ports 212-220). Furthermore, a number of peripherals are attached to several of the ports. Peripheral 1 (P1) web camera 222 is coupled to peripheral 2 (P2) display monitor 224 which is coupled to unified connector port 212. Peripheral 3 (P3) display monitor 226 is coupled to unified connector port 214. Peripheral 4 (P4) wireless router 228 is coupled to unified connector port 218. Finally, peripheral 5 (P5) USB printer 230 is coupled to unified connector port 220.

In many embodiments, the unified connector architecture employs packet switching communication to exchange data between the host controllers (200-210) and the attached peripherals (222-230). Packet switching is a common packet transmission method from between a host controller and a peripheral device. A common discovery protocol is utilized to enumerate the peripherals connected to the platform and also to detect any hot-plug of peripherals. Once the peripherals are enumerated, a data transfer protocol is used to exchange application I/O data between a specific host controller and a specific peripheral. In some embodiments, the unified connector architecture discovery and data transfer protocols may be extensions of the respective USB 2.0 protocol counterparts (as defined in USB Specification, Revision 2.0, published on Apr. 27, 2000). In other embodiments, the unified connector architecture discovery and data transfer protocols may be an extension of any other type of feasible device discovery and data transfer protocol available.

The enumeration of the attached peripherals (222-230) is performed by a connection manager 232. In different embodiments, the connection manager 232 may be implemented as a piece of low-level firmware, as logic within the UCA router 116, as part of the system BIOS (basic input/output system), or within an operating system running on the computer system. The connection manager 232 is responsible for identifying the type of the peripheral connected to a unified connector port (e.g. a display, a network device, a USB device, etc.) and assigning a unique address to the peripheral. In many embodiments, multi-function devices are assigned multiple addresses.

In many embodiments, the association between each peripheral (P1-P5) and the specific host controller (one of 200-210) that handles the peripheral's I/O data is defined in a binding table 234. The binding table may be implemented in any type of memory within the system, such as system memory, a cache, a buffer, etc. The UCA router 116 uses the binding table to find the correct data packet (i.e. frame) transmission target. Using the binding table, the transmission target is dependent upon the origination of the packet/frame being sent. If the router receives a data packet from a host controller (i.e. the display controller, network controller, I/O controller, etc), the target is the port where intended target peripheral is coupled (i.e. plugged into). If the router receives a unified connector protocol data packet from the unified connector port (i.e. the data packet initiates from the peripheral device coupled to the port), the target is the host controller bound to that peripheral. For example, display controller 200 sends a packet of display data targeting the P2 display 224, the UCA router 116 receives the packet, determines the target peripheral (P2) using the binding table (e.g. P2 is bound to the A link, which is coupled to display controller 200), encapsulates the data packet into a unified connector protocol data packet, and sends the packet to P2 through unified connector port 212. In many embodiments, peripherals can be chained together off of a single port, such as P1 being chained to P2, which is coupled to unified connector port 212. FIG. 2 shows an instance of the binding table that clarifies P1 is bound to link F (USB host controller 210), P2 is bound to link A (display controller 200), P3 is bound to link C (display controller 204), P4 is bound to link D (network interface controller 206), and P5 is also bound to link F (USB host controller 210).

In many embodiments, the binding table is initially setup by the connection manager at system boot (i.e. when the system power is cycled, or when the controlling operating system performs a soft restart of the computer). It can also be re-mapped during runtime by system software (an operating system or a virtual machine manager) to implement changing usage models based on dynamic switching of system I/O flows. For example, in a mobile platform, a display peripheral can be associated with a discrete graphics controller when the system is plugged in and can be dynamically switched to an integrated graphics controller when the system is running on a battery by remapping the binding information.

The UCA router 116 is also responsible for the packetization and encapsulation of display and network I/O data. In many embodiments, the UCA router 116 has one or more internal buffers to hold a continuous stream of display data while building a unified connector protocol data packet (i.e. frame). Thus, logic within the UCA router 116 may store a stream in a buffer, build individual frames out of the stored stream information, and send frames when they are complete. In other embodiments, one or more of the host controllers (200-210), have knowledge of the UCA router 116 and unified connector protocol format. In these embodiments where the host controllers have knowledge of the UCA router 116, the host controllers with knowledge may construct unified connector protocol data packets themselves and exchange native unified connector protocol frames with the UCA router 116, thus relieving the UCA router 116 of translation/switching duty. In this scenario the UCA router 116 may just be required to forward these pre-encapsulated data packet frames to the targeted peripheral(s).

In many embodiments, the UCA router 116 is also responsible for the deconstruction of unified connector protocol data packets into corresponding native host controller format data packets. This occurs when the peripheral, bound to a specific host controller, sends a unified connector protocol data packet targeting the host controller. This packet arrives from the peripheral at the unified connector port, where the UCA router 116 takes the packet and deconstructs the packet back into a native format for the host controller and then transmits the deconstructed native data packet to the targeted host controller.

Figure 3:
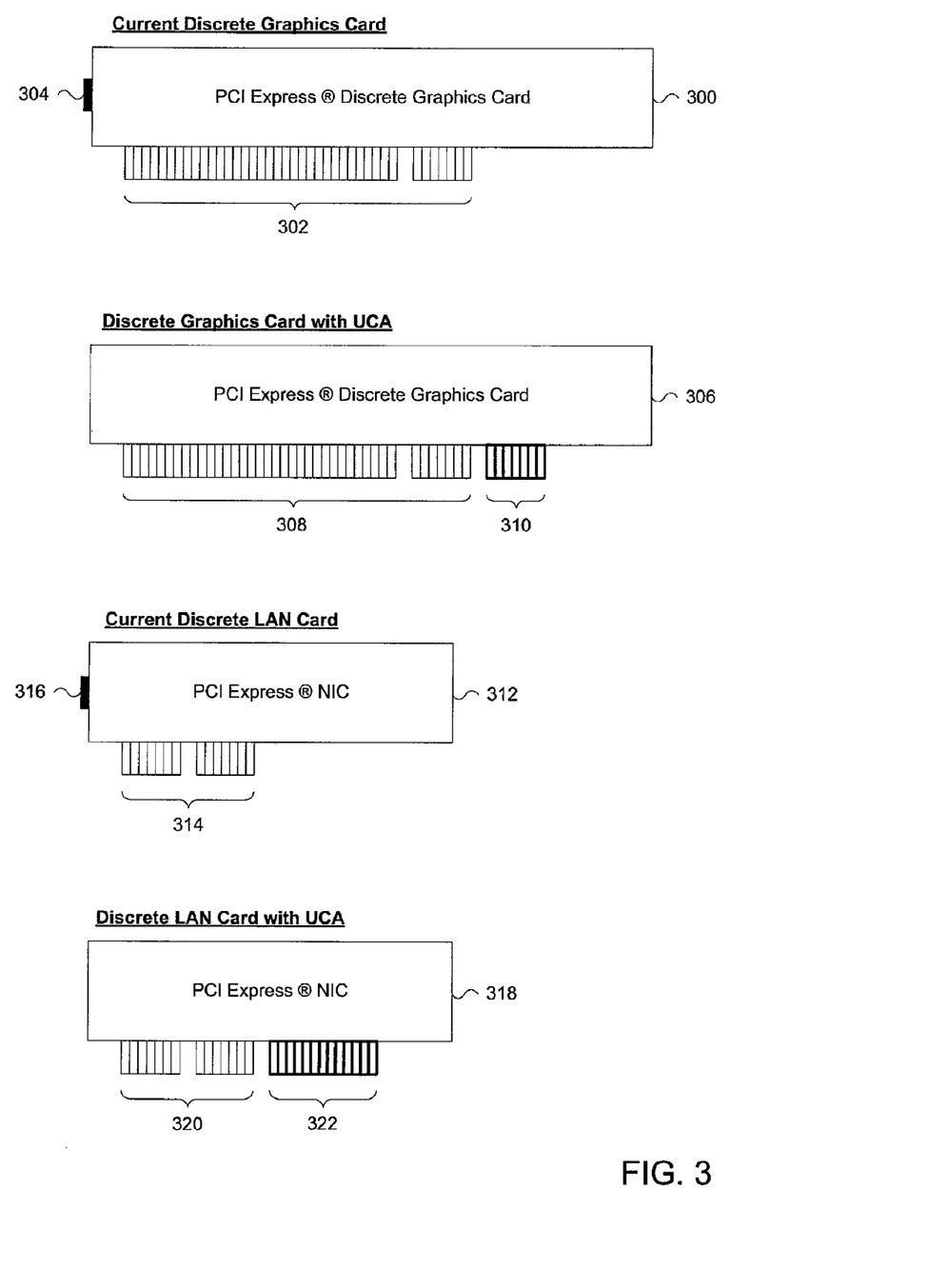
FIG. 3 describes an embodiment of the unified connector architecture slot connector for discrete graphics and local area network (LAN) cards.

FIG. 3 describes an embodiment of the unified connector architecture slot connector for discrete graphics and local area network (LAN) cards. To illustrate the modifications to current discrete graphics and LAN cards, FIG. 3 shows a current version of each card side-by-side with a unified connector architecture (UCA) version of each card. The examples shown in FIG. 3 utilize PCI Express®, though any other relevant protocol may be used.

A current version of a PCI Express® discrete graphics card 300 is shown. Graphics card 300 includes a slot connector pins 302 as shown. Additionally, graphics card 300 has an external display peripheral connector 304. In current PCI Express® discrete graphics scenarios, data from the CPU and system memory is sent to the graphics card 300 across a PCI Express® link that is physically coupled to slot connector pins 302 when graphics card 300 is plugged into the PCI Express® graphics card slot on the computer system motherboard. The graphics card 300 then operates on this received data and sends it to a display peripheral plugged into external display peripheral connector 304.

Turning now to the discrete graphics card with UCA 306, in the embodiment shown in FIG. 3, a UCA-capable graphics card 306 includes the slot connector pins 308, similar to the current version graphics card 300. Although, instead of having an external display peripheral connector, the discrete graphics card with UCA 306 has extra slot connector pins 310. Once the discrete graphics card with UCA 306 has received data from the PCI Express® link (from slot connector pins 308) and has operated on the received data, the UCA-capable graphics card 306 sends the data to a display peripheral plugged into a unified connector port on the motherboard. Specifically, the data is sent across additional PCI Express® link lanes are routed from the slot connector to the UCA router in the system (this is shown as link 132 in FIG. 1). These additional link lanes are physically coupled to the extra slot connector pins 310.

Next, FIG. 3 shows a current version of a PCI Express® discrete LAN card 312 (which has a NIC integrated on the card). LAN card 312 includes slot connector pins 314 as shown. Additionally, LAN card 312 has an external LAN/Ethernet connector 316. In current PCI Express® discrete LAN card scenarios, data from the CPU and system memory is sent to the LAN card 312 across a PCI Express® link that is physically coupled to slot connector pins 314 when LAN card 312 is plugged into a PCI Express® LAN card slot on the computer system motherboard. The LAN card 312 then packetizes this received data and sends it across the network that LAN/Ethernet connector 316 is plugged into.

Finally, turning now to the discrete LAN card with UCA 318, in the embodiment shown in FIG. 3, a UCA-capable LAN card 318 includes the slot connector pins 320, similar to the current version LAN card 312. Although, instead of having an external LAN/Ethernet connector, the discrete LAN card with UCA 318 has extra slot connector pins 310. Once the discrete LAN card with UCA 312 has received data from the PCI Express® link (from slot connector pins 320) and has packetized the received data, the UCA-capable LAN card 318 sends the data to an Ethernet cable plugged into a unified connector port on the motherboard. Specifically, the data sent across additional PCI Express® link lanes are routed from the slot connector to the UCA router in the system (this is shown as link 134 in FIG. 1). These additional link lanes are physically coupled to the extra slot connector pins 322.

Figure 4:
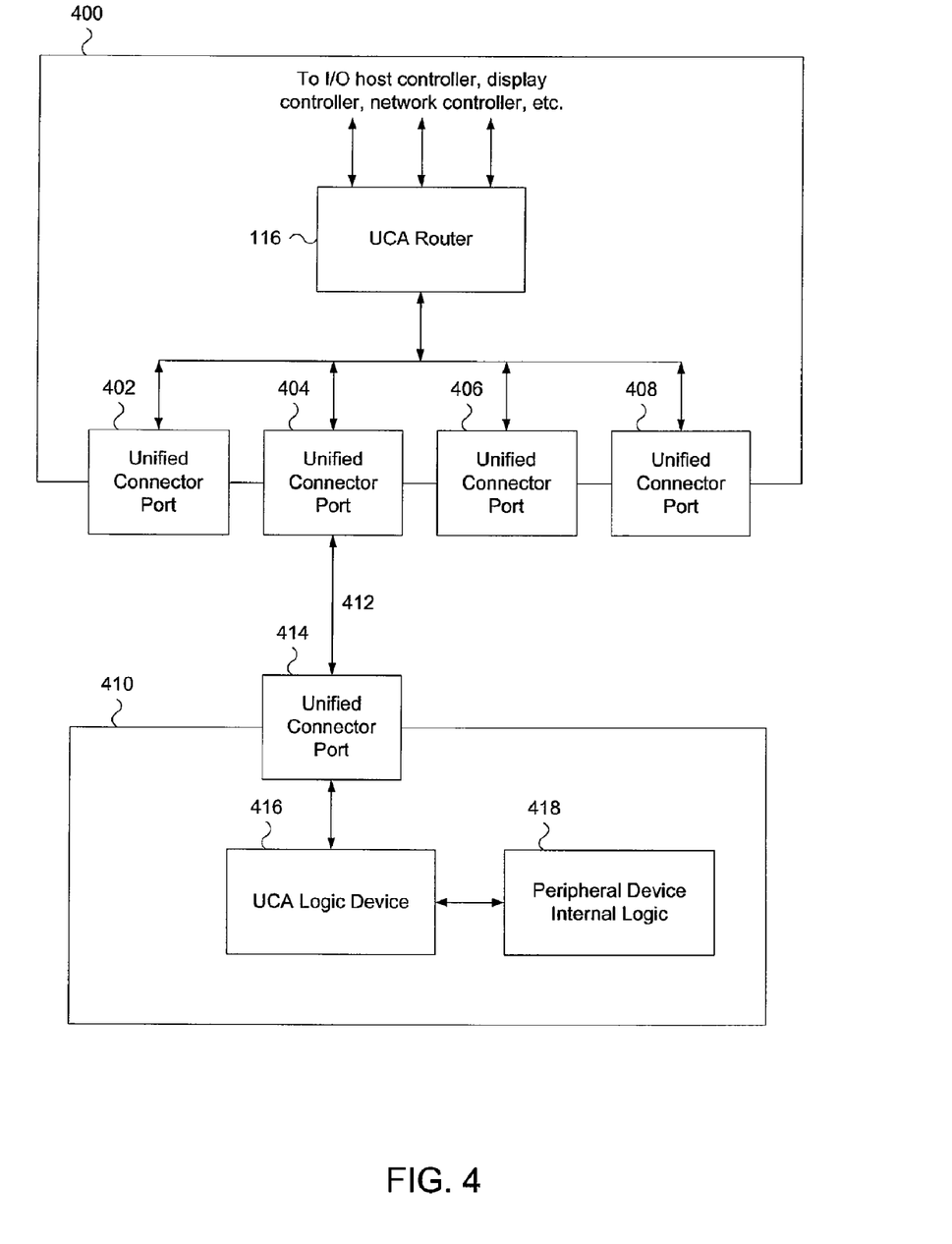
FIG. 4 describes one embodiment of the unified connector architecture extended into a peripheral device.

FIG. 4 describes one embodiment of the unified connector architecture extended into a peripheral device. In many embodiments, the computer system 400 employing the unified connector architecture includes all of the specific components described in FIGS. 1-3. Specifically, the UCA router 116 is present and is coupled to one or more host controllers (including potentially I/O host controllers, display controllers, network controllers, etc) as well as to one or more universal connector ports (in this example there are four ports: universal connector ports 402, 404, 406, and 408).

In many embodiments, a peripheral device 410 is coupled to the computer system 400 through a cable 412 plugged into universal connector port 404. On the peripheral device 410 side, cable 412 is plugged into universal connector port 414, which may have an identical form factor as universal connector port 404. Peripheral device 410 has an integrated UCA logic device 416. In some embodiments, the UCA logic device 416 has the same functionality as UCA router 116 in computer system 400 (e.g. such as within a multifunction display with USB ports). In other embodiments, UCA logic device 416 is a simple protocol converter that converts the unified connector protocol data packets to data packets of the native protocol of the peripheral device, and vice versa.

UCA logic device 416 in peripheral device 410 receives unified connector protocol data packets sent from UCA router 116 in computer system 400 targeting the peripheral device. In some embodiments, UCA logic device 416 also receives data packets in the native peripheral device format from peripheral device internal logic 418. In other embodiments, peripheral device internal logic 418 comprehends unified connector protocol data packet format natively, which allows the internal logic to construct the unified connector protocol data packets and send them in that format to UCA logic device 416. In these embodiments, UCA logic device 416 is not required to perform any encapsulation work for data packets (i.e. frames) traveling in either direction (i.e. from the peripheral device internal logic 418 to the computer system 400 and vice versa). Rather, in these embodiments, UCA router 416 simply forwards the data packets to the appropriate target as it receives them.

Figure 5:
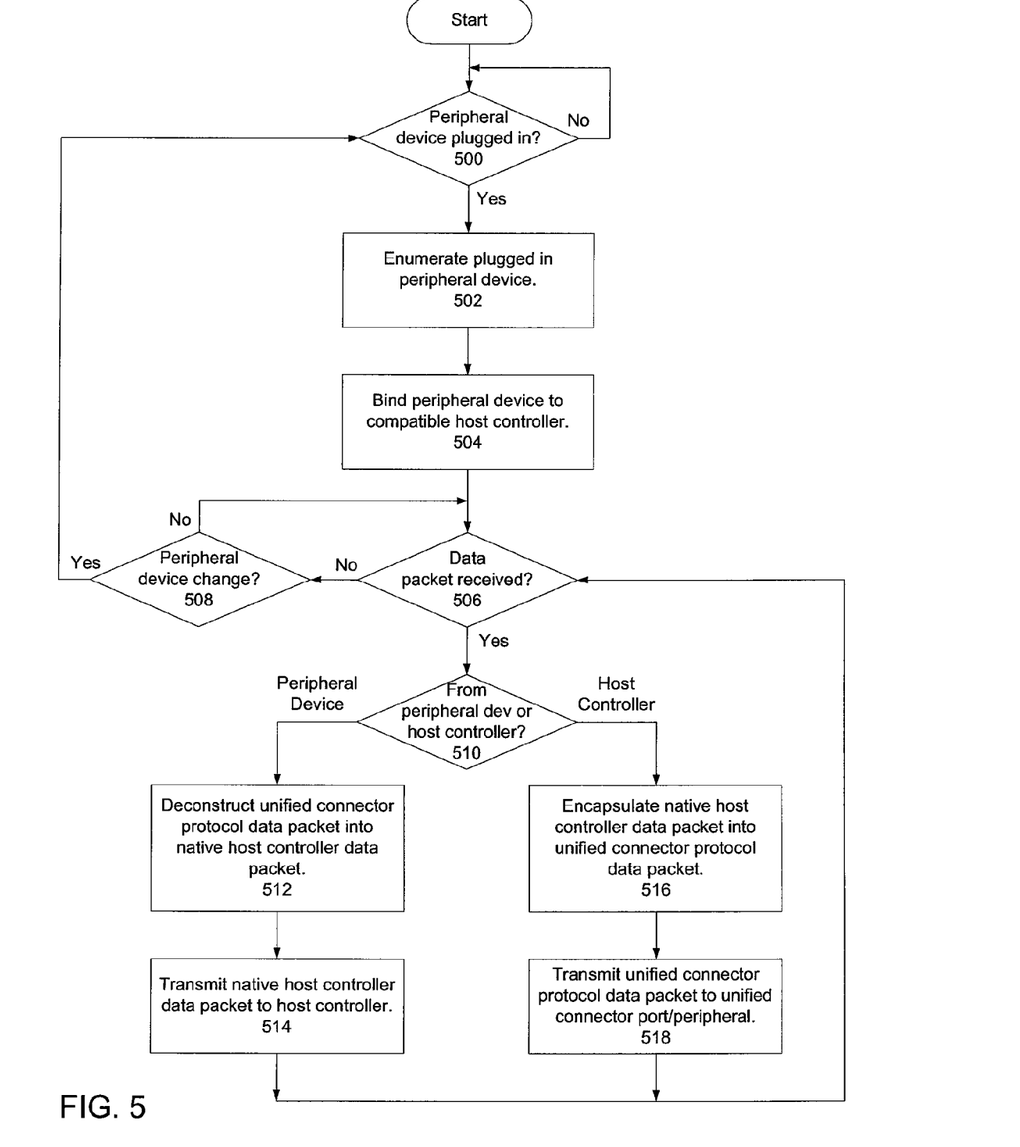
FIG. 5 is a flow diagram of one embodiment of a process to route data packets in a unified connector architecture environment.

FIG. 5 is a flow diagram of one embodiment of a process to route data packets in a unified connector architecture environment. The process may be performed by hardware, software, or a combination of both. Turning now to FIG. 5, the process begins by processing logic determining whether a peripheral device has been plugged into a unified connector port (processing block 500). "Plugging in" refers to the peripheral device being coupled or connected to the unified connector port. In different embodiments, the "plugging in" can occur at any time, such as prior to boot or during full system operation when hot-plugging is allowed. If no peripheral device has been plugged, then in processing block 500 repeats (i.e the unified connector port is polled—either continuously or a polling can occur once every set period of time).

Next, once processing logic has detected that the device has been plugged in, processing logic then enumerates the peripheral device (processing block 502). Then processing logic binds the peripheral device to a host controller present in the system (processing block 504). The peripheral device is bound to the host controller it is compatible with (i.e. they share the same protocol).

After the binding, processing logic determines whether a data packet has been received (processing block 506). If a data packet has not been received, processing logic determines whether there has been a change/modification in the peripheral device (processing block 508). For example, a first peripheral device has been unplugged and a second peripheral device has been plugged into the same unified connector port. If there is no change in the status of the peripheral device, processing logic returns to processing block 506 and again checks if a data packet has been received. Otherwise, if a change has been detected with the peripheral device, then processing logic returns to processing block 500 to recheck if a peripheral device is plugged into the unified connector port.

Returning to processing block 506, if a data packet has been received, processing logic determines whether the data packet has been received from the peripheral device or the host controller (processing block 510). If the data packet has been received from the peripheral device, then the data packet is a unified connector protocol data packet and processing logic proceeds to deconstruct the unified connector protocol data packet into one or more native host controller data packets that are compatible with the host controller's protocol (processing block 512). After processing logic has deconstructed the unified connector protocol data packet into the native host controller protocol data packet(s), processing logic then transmits the native host controller data packet(s) to the host controller (processing block 514). Then processing logic returns to processing block 506 to check if another data packet has been received.

Returning to processing block 510, if the data packet is from the host controller then the data packet is in the host controller's native protocol format and processing logic proceeds to encapsulate the native host controller data packet into a unified connector protocol data packet (processing block 516). Once the unified connector protocol data packet has been created, processing logic then transmits the unified connector protocol data packet to the unified connector port targeting the peripheral device plugged into the port (processing block 518). Finally, processing logic returns to processing block 506 to check if another data packet has been received and the process is finished.

Thus, embodiments of a system, device, and method to implement a unified connector architecture on a computer platform are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A system, comprising:
a first host controller using a first protocol;
a second host controller using a second protocol, wherein the first and second protocols are different;
a unified connector port capable of having a unified connector form factor plug plugged into it, the unified connector port capable of providing a communicative coupling to allow communication using the first protocol between the first host controller and a first unified connector port-compatible peripheral device plugged into the port at a first time and capable of providing a communicative coupling to allow communication using the second protocol between the second host controller and a second unified connector port-compatible peripheral device plugged into the port at a second time; and
a router, coupled to the first host controller, the second host controller, and the unified connector port, the router to:
encapsulate a physical layer packet received from the first host controller into a first unified connector protocol frame and transmit the first frame to the unified connector port;
encapsulate a physical layer packet received from the second host controller into a second unified connector protocol frame and transmit the second frame to the unified connector port; and
encapsulate one or more physical layer packets received from one or more additional host controllers apart from the first and second host controllers, wherein the one or more additional host controllers have one or more protocols that are different from the first and second protocols, into one or more additional unified connector protocol frames and transmit the one or more additional frames to the unified connector port; and
a memory to store a binding table which is populated at system boot, the binding table containing associations between peripheral devices and host controllers.

2. The system of claim 1, further comprising:
a third unified connector port-compatible peripheral device coupled to the unified connector port; and
a connection manager logic to
identify the third peripheral device type; and
assign a unique address to the third peripheral device.

3. The system of claim 2,
wherein the router is further operable to utilize the binding table to determine an association between the third peripheral device and one of the first host controller and the second host controller, the association to inform the router whether to transmit a physical layer packet received from the third peripheral device to the first host controller or to the second host controller.

4. The system of claim 1, wherein the router further comprises:
a buffer, the buffer to store a stream of data, wherein a plurality of packets within the stream comprise one unified connector protocol frame.

5. The system of claim 4, further comprising:
a graphics controller to generate a stream of display data packets, the graphics controller coupled directly to the router through one or more lanes of a high-speed, bi-directional serial link, wherein the router is further operable to build a unified connector protocol frame in the buffer from a plurality of the stream of display data packets.

6. The system of claim 5, wherein the graphics controller is located on a discrete graphics card plugged into a discrete graphics slot, the discrete graphics slot comprising a multi-use slot connector, a first portion of the multi-use slot connector to couple the slot to the router through a high-speed, bi-directional serial link and a second portion of the multi-use slot connector to couple the slot to a central processing unit.

7. The system of claim 4, further comprising:
a network interface controller to send and receive a stream of network data packets, the network interface controller coupled to the router,
wherein the router is further operable to build a unified connector protocol frame in the buffer from a plurality of the network data packets.

8. A device, comprising:
a router, coupled to a first host controller, a second host controller, and a unified connector port, the router to:
encapsulate a physical layer packet received from the first host controller into a first unified connector protocol frame and transmit the first frame to the unified connector port;
encapsulate a physical layer packet received from the second host controller into a second unified connector protocol frame and transmit the second frame to the unified connector port; and
encapsulate one or more physical layer packets received from one or more additional host controllers apart from the first and second host controllers, wherein the one or more additional host controllers have one or more protocols that are different from the first and second protocols, into one or more additional unified connector protocol frames and transmit the one or more additional frames to the unified connector port;
wherein the unified connector port is capable of having a unified connector form factor plug plugged into it, the unified connector port capable of providing a communicative coupling to allow communication using the first protocol between the first host controller and a first unified connector port-compatible peripheral device plugged into the port at a first time and capable of providing a communicative coupling to allow communication using the second protocol between the second host controller and a second unified connector port-compatible peripheral device plugged into the port at a second time; and
a memory to store a binding table which is populated at system boot, the binding table containing associations between peripheral devices and host controllers.

9. The device of claim 8, wherein the router further comprises a firmware to store connection manager logic, the connection manager logic to
identify a type for the first peripheral device coupled to the unified connector port; and
assign a unique address to the first peripheral device.

10. The device of claim 9,
wherein the router is further operable to utilize the binding table to determine an association between the first peripheral device and the first host controller, the association to inform the router to transmit a physical layer packet received from the first peripheral device to the first host controller.

11. The device of claim 8, wherein the router further comprises:
a buffer, the buffer to store a stream of data, wherein a plurality of packets within the stream comprise one unified connector protocol frame.

12. The device of claim 11, wherein the router is further operable to build a unified connector protocol frame in the buffer from a stream of a plurality of display data packets generated from a graphics host controller.

13. The device of claim 11, wherein the router is further operable to build a unified connector protocol frame from a stream of a plurality of network data packets, the router receiving the network data packets from one of the unified connector port and a network interface controller.

14. A method, comprising:
encapsulating a physical layer packet received from a first host controller utilizing a first input/output (I/O) protocol into a first unified connector protocol frame; transmitting the first frame to a unified connector port;
encapsulating a physical layer packet received from a second host controller utilizing a second I/O protocol into a second unified connector protocol frame; transmitting the second frame to the unified connector port; and
wherein the a unified connector port is capable of having a unified connector form factor plug plugged into it, the unified connector port capable of providing a communicative coupling to allow communication using the first protocol between the first host controller and a first unified connector port-compatible peripheral device plugged into the port at a first time and capable of providing a communicative coupling to allow communication using the second protocol between the second host controller and a second unified connector port-compatible peripheral device plugged into the port at a second time;
encapsulating one or more physical layer packets received from one or more additional host controllers apart from the first and second host controllers, wherein the one or more additional host controllers have one or more protocols that are different from the first and second protocols, into one or more additional unified connector protocol frames and transmit the one or more additional frames to the unified connector port; and
storing a binding table in a memory which is populated at system boot, the binding table containing associations between devices and controllers.

15. The method of claim 14, further comprising:
identifying a type for a third peripheral device coupled to the unified connector port; and
assigning a unique address to the first peripheral device.

16. The method of claim 15, further comprising:
determining an association between the third peripheral device and one of the first host controller and the second host controller, the association to establish the transmission target host controller.

17. The method of claim 16, further comprising determining the association when the third peripheral device is plugged into the unified connector port.

18. The method of claim 14, further comprising building a unified connector display frame from a plurality of packets in a stream of data generated from a graphics controller.

19. The method of claim 18, further comprising building a unified connector network data frame from a plurality of network data packets in a stream of data generated from one of the unified connector port and a network interface controller.

20. The method of claim 15, further comprising:
deconstructing a third unified connector protocol frame, received from the unified connector port, into one or more resulting physical layer packets;
transmitting the one or more resulting physical layer packets from the deconstructed third frame to the first host controller;
deconstructing a fourth unified connector protocol frame, received from the unified connector port, into one or more resulting physical layer packets; and
transmitting the one or more resulting physical layer packets from the deconstructed fourth frame to the second host controller.

21. The method of claim 20, further comprising:
the third peripheral device sending the third protocol frame, the third peripheral device compatible with the protocol of the first host controller; and
a fourth peripheral device sending the fourth protocol frame, the fourth peripheral device compatible with the protocol of the second host controller,
wherein the third peripheral device, after sending the third protocol frame, is decoupled from the unified connector port and the fourth peripheral device, prior to sending the fourth protocol frame, is subsequently coupled to the unified connector port.

22. A system, comprising:
a first host controller using a first protocol;
a second host controller using a second protocol, wherein the first and second protocols are different;
a unified connector port having a form factor configured to physically couple to a plug; and
a router to selectively encapsulate packets from the first host controller and from the second host controller into unified protocol frames and transmit at least some of the frames to the unified connector port;
wherein (1) if the router is coupled to a first device through the plug, the router provides encapsulated packets from the first host controller to the unified connector port, wherein the first device recognizes signals with the first protocol, and (2) if the router is coupled to a second device through the plug, the router provides encapsulated packets from the second host controller to the unified connector port, wherein the second device recognizes signals with the second protocol.

23. The system of claim 22, wherein the router is coupled to the first host controller and the second host controller.

24. The system of claim 22, wherein the system further includes the first device coupled to the router through the plug.

25. The system of claim 22, wherein the system further includes the second device coupled to the router through the plug.

26. The system of claim 22, wherein the unified connector port is a first unified connector port, and wherein the system further comprises a second unified connector port having the form factor.

27. The system of claim 26, wherein the router is configured to selectively encapsulate packets from the first host controller and from the second host controller into unified protocol frames and transmit at least some of the frames to the second unified connector port.

28. The system of claim 22, wherein the unified connector port is configured to transmit the unified protocol frames over an I/O link.

29. The system of claim 28, wherein the unified connector port is configured to concurrently transmit unified protocol frames of encapsulated physical layer packets of the first host protocol over a first subset of lanes of the I/O link and unified protocol frames of encapsulated physical layer packets of the second host protocol over a second subset of lanes of the I/O link.

30. The system of claim 22, wherein the unified connector port is configured to selectively transmit unified protocol frames of encapsulated physical layer packets of the first protocol over all of a plurality of lanes of an I/O link, transmit unified protocol frames of encapsulated physical layer packets of the second protocol over all of the plurality of lanes of the I/O link, or concurrently transmit unified protocol frames of encapsulated physical layer packets of the first host protocol over a first subset of the plurality of lanes of the I/O link and unified protocol frames of encapsulated physical layer packets of the second host protocol over a second subset of lanes of the I/O link.

31. The system of claim 22, wherein if the router is coupled, through the plug, to a third device and to a fourth device coupled to the third device, the router provides encapsulated packets from the first host controller and encapsulated packets from the second host controller to the unified connector port, wherein the third device recognizes signals with the first protocol, and wherein the fourth device recognizes signals with the second protocol.

32. The system of claim 22, further comprising memory to store a binding table containing associations between the first device and the first host controller and between the second device and the second host controller.

33. The system of claim 32, wherein the system is configured to populate the binding table at system boot.

34. The system of claim 32, wherein the system is configured to modify the associations during runtime.

35. The system of claim 32, wherein the system is configured to detect a third device coupled to the unified connector port during runtime and modify the binding table to associate the third device with the first host controller or the second host controller.

36. The system of claim 22, further comprising connection manager logic to enumerate the first device if the router is coupled to the first device through the plug, and enumerate the second device if the router is coupled to the second device through the plug.

37. The system of claim 36, wherein the connection manager logic is configured to associate the first device with the first host controller, and associate the second device with the second host controller.

38. The system of claim 37, wherein the connection manager logic is configured to perform the associations at system boot.

39. The system of claim 38, wherein the connection manager logic is configured to modify the associations during runtime.

40. The system of claim 22, further comprising a third host controller using a third protocol, wherein the first, second, and third protocols are different, and wherein the router is configured to selectively encapsulate packets from the third host controller into unified protocol frames, and wherein if the router is coupled to the third device through the plug, the router provides encapsulated packets from the third host controller to the unified connector port, wherein the third device recognizes signals with the third protocol.

41. The system of claim 40, wherein the router is configured to:
receive unified protocol frames from the unified connector port;
deconstruct the unified protocol frames into second-protocol physical layer packets, third-protocol physical layer packets, or both the second-protocol physical layer packets and the third-protocol physical layer packets; and transmit the second-protocol physical layer packets to the second host controller and the third-protocol physical layer packets to the third host controller.

42. A system, comprising:

a router to selectively encapsulate packets from a first host controller and from a second host controller into unified protocol frames and transmit at least some of the frames to a unified connector port, wherein the first and second protocols are different; and connection manager logic configured to (1) associate a first device with the first host controller, if the router is coupled, through a first plug, to the first device, wherein the first device recognizes signals with the first protocol, and (2) associate a second device with the second host controller, if the router is coupled, through a second plug, to the second device, wherein the second device recognizes signals with the second protocol, and wherein the first plug and the second plug have a same form factor.

43. The system of claim 42, wherein if the router is coupled, through the first plug or the second plug, to a third device coupled to the first device, the router provides encapsulated packets from the first host controller and encapsulated packets from the second host controller to the unified connector port, wherein the third device recognizes signals with the second protocol.

44. The system of claim 42, wherein the system includes the unified connector port.

45. The system of claim 42, wherein the connection manager logic is configured to perform the associations at system boot.

46. The system of claim 45, wherein the connection manager logic is configured to modify the associations during runtime.

47. The system of claim 46, wherein the connection manager logic is configured to modify the associations during runtime to implement a change in a usage model of the first device or the second device.

* * * * *